UNITED STATES PATENT OFFICE.

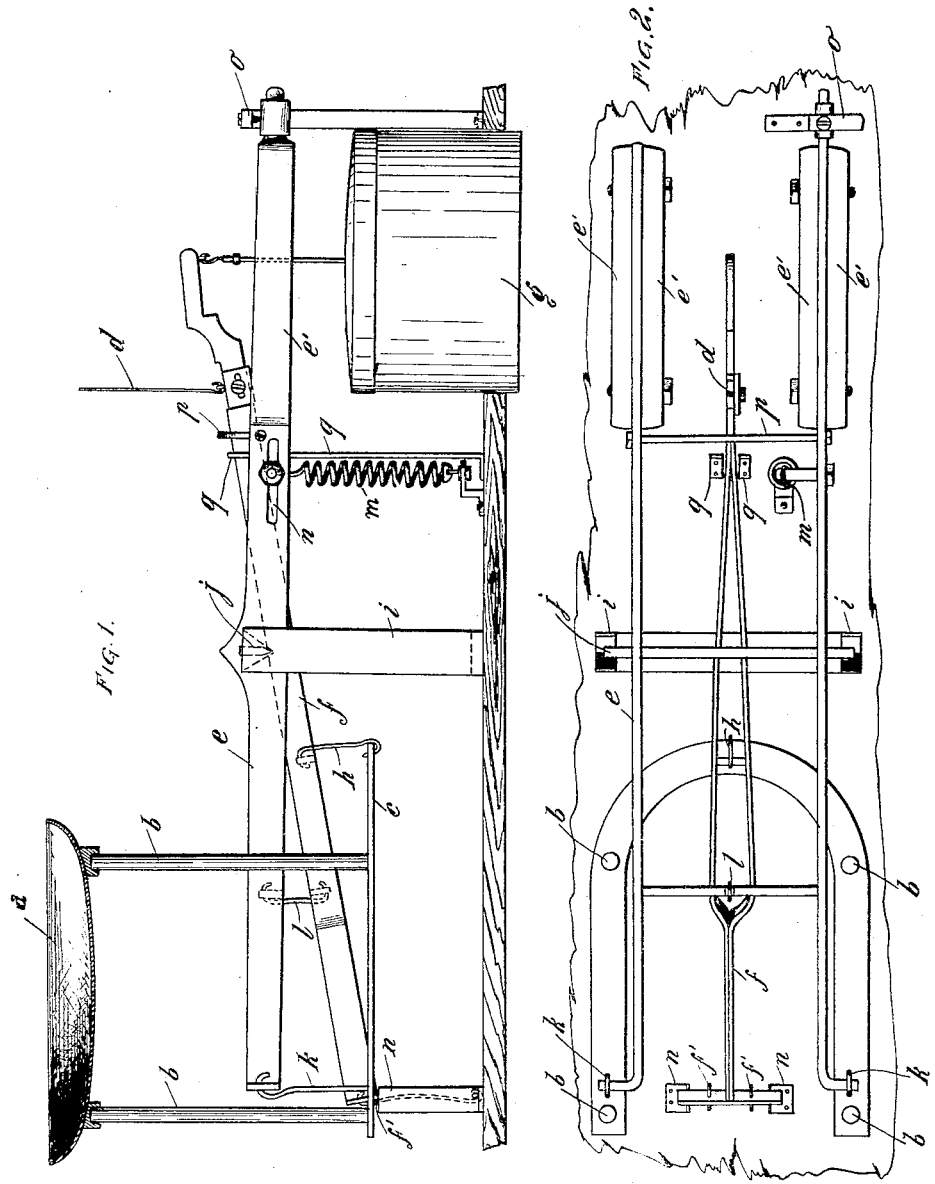

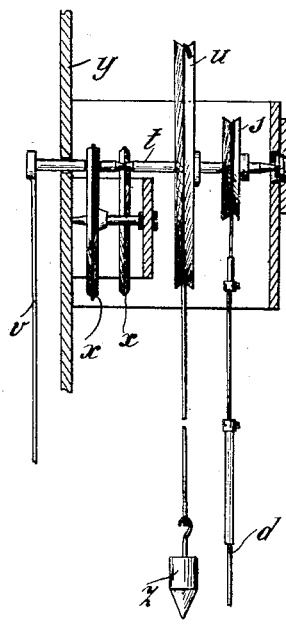
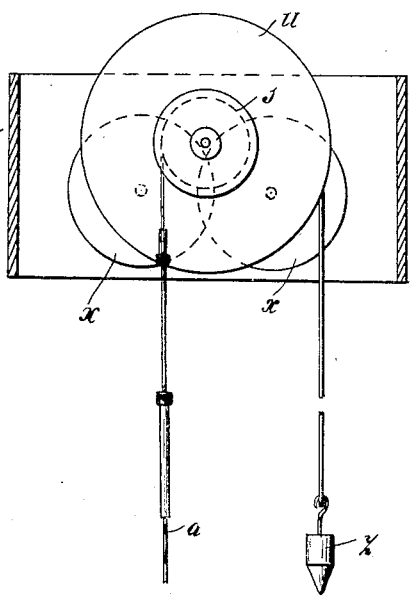
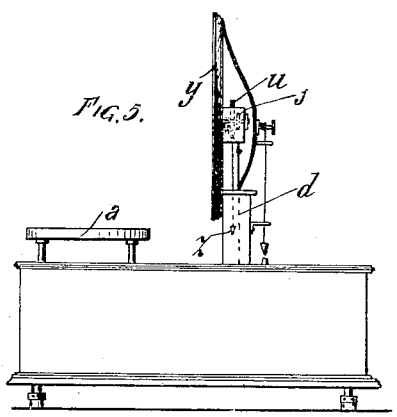
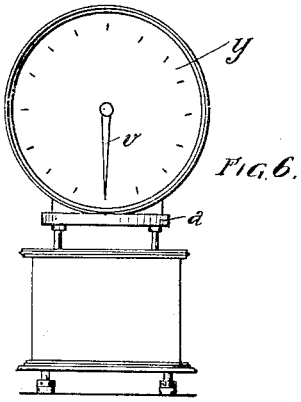

PAOLO GHEZZI, OF MILAN, ITALY.

WEIGHING APPARATUS.

1,128,128. Specification of Letters Patent. Patented Feb. 9, 1915.

Application filed September 26, 1913. Serial No. 791,975.

*To all whom it may concern:*

Be it known that I, PAOLO GHEZZI, a subject of the King of Italy, residing at 19 Via Pontaccio, Milan, in the Kingdom of Italy, have invented certain new and useful Improvements in Weighing Apparatus, of which the following is a specification.

The present invention relates to an improvement in weighing apparatus by which a pair of scales is produced having the same properties as weighing apparatus of greater dimensions.

In a weighing apparatus according to the present invention, the progressive force necessary for equilibrating the weight placed upon the other plate, is produced by the tension of a spring and not by the displacement of a counterweight. The advantage is thus obtained that the sub-divisions of the scale are uniform owing to the fact that the extensions of the spring are exactly proportional to the weight placed upon the plate of the scales. Moreover, considerable economy in space is effected.

It is obvious that the arrangement illustrated in the accompanying drawing is given by way of example only and that any construction modifications within the limits of the invention may be made.

Figure 1 shows the mechanism of the scales, in elevation and Fig. 2 is a plan thereof. Fig. 3 is a side elevation of the indicating device and Fig. 4 is a front elevation thereof. Fig. 5 shows, on a smaller scale, the apparatus in side elevation while Fig. 6 is a front elevation thereof.

The plate $a$ is carried by the four rods $b$ of the base $c$, which, in the drawing, is U-shaped and is suspended, at its front end, by means of a hook $h$, to an arm $f$ to which a small articulated rod $d$ is secured leading to the indicating mechanism and, at its rear end, by means of two hooks $k$ to one end of the beam $e$, $e$. From the end of the rod $f$ nearest to the rod $d$, the piston of the damping device $g$ is suspended, while at the other end, the hook $f'$ secured to the base of the apparatus, constitutes the pivot of the arm $f$. A hook $l$ connects the latter arm to the beam $e$, $e$ which is constituted by two knife edges integral with each other and adapted to pivot about $j$, $j$ upon the vertical supports $i$, $i$. The oscillation of the beam $e$, $e$ is counterbalanced by a spring $m$ which can be displaced owing to the provision of the pin $n$ and which has the same action as the counterweight in ordinary weighing apparatus. The number and the position of the springs such as $m$ can be varied. A stop $o$ limits the oscillations of the beam $e$, $e$ provided with counterweights $e'$ which equilibrate the fixed weight of the supporting means for the plate and of the plate itself. The stops $q$ limit the lateral oscillations of the arm $f$.

The rod $d$ the tension of which can be adjusted, is wound on a grooved pulley $s$ mounted upon the axis $t$, upon which the pulley $u$ is also mounted and takes up the suspension cord of the counterweight $z$ the purpose of which is to keep the rod $d$ always taut, and the pointer $v$ which indicates on the scale $y$ the weights; the antifriction wheels $x$, $x$ and the support $w$ are the bearing points of the small shaft $t$. By means of this arrangement a balance is obtained the construction of which is compact, and is perfectly adjustable and extremely sensitive.

What I claim and desire to secure by Letters Patent of the United States is:—

1. In a weighing apparatus in combination with a base, uprights mounted on said base, pivoted beam members mounted on said uprights, a weighing support carried by the beam members at one end, spring counterpoise means acting between the pivot and the end of the beam opposite to said weighing support, a rod connecting said beam members, an arm connected to said rod, so that said arm may be suspended between said beam members, and attached to said weighing support, a counterweight formed on the extremity of each beam member farthest from said weighing support, for equilibrating the weight of the weighing supports, and a registering device attached to said arm for indicating the weighing oscillations of the beam members.

2. In a weighing apparatus in combination with a base, uprights mounted on said base, pivoted beam members mounted on said uprights, weighing support carried by the beam members at one end, spring counterpoise means acting between the pivot and the end of the beam opposite to said weighing support, a rod connecting said beam members, an arm connected to said rod so that said arm may be suspended between said beam members and attached to said weighing support, a counterweight formed on the extremity of each beam member farthest from said weighing support, for equilibrating the weight of the weighing supports, a registering device attached to said arm, for indicating the weighing oscillations of the beam members, and a damping device attached to said arm.

3. A weighing machine comprising in combination a pair of beam members, knife edges acting as fulcrums therefor, uprights carrying said knife edges, a base carrying said upright, a weighing plate, means supporting said weighing plate between the beam members at one end, a rod connecting said beam members, an arm connected to said rod, so that said arm may be suspended from the beam members and attached to the supporting means for said weighing plate, spring counterpoise means acting between the pivot and the end of the beam members opposite to said weighing plate, a counterweight formed on the extremity of each beam member farthest from said weighing support, for equilibrating the weight of the weighing plate and the supporting means therefor, a damping device and a registering device for indicating the oscillations of the beam both attached to the arm suspended between the beam members.

4. A weighing machine comprising in combination a pair of beam members, knife edges acting as fulcrum therefor, uprights carrying said knife edges, a base carrying said uprights, a weighing device, supports for said weighing device, whereby it is suspended between the beam members at one end, a rod connecting said beam members an arm connected to said rod, so that said arm may be suspended from the beam members and attached to the supporting means for the weighing device and to said base means for limiting the oscillations of said arm, counterpoise means, comprising a slot in one of the beam members, a spring attached to the base at one end, the opposite end being mounted and capable of movement in the said slot in one of the beam members, counterweights formed on the extremity of each beam member farthest from said weighing device for equilibrating the weight of the weighing plate and the supporting means therefor, means for limiting the oscillations of the beam members, a damping device attached to said arm, and a registering device attached to said arm for indicating on a scale the oscillations of the beam.

In testimony whereof I affix my signature in presence of two witnesses.

PAOLO GHEZZI.

Witnesses:
   BLARBLO FALVOLLI,
   PIETRO CALCAGNI.